US006912444B2

(12) United States Patent
Pohl et al.

(10) Patent No.: US 6,912,444 B2
(45) Date of Patent: Jun. 28, 2005

(54) DEVICE FOR RELIABLE POSITION MONITORING

(75) Inventors: Martin Pohl, Traunwalchen (DE); Alfons Baumgartner, Grassau (DE); Frieder Kohler, Lauter (DE); Berhard Wastlhuber, Siegsdorf (DE); Andreas Balleisen, Tittmoning (DE)

(73) Assignee: Dr. Johannes Heidenhain GmbH, Traunruet (DE)

( * ) Notice: Subject to any disclaimer, the term of this patent is extended or adjusted under 35 U.S.C. 154(b) by 351 days.

(21) Appl. No.: 10/339,010

(22) Filed: Jan. 8, 2003

(65) Prior Publication Data

US 2003/0130816 A1 Jul. 10, 2003

(30) Foreign Application Priority Data

Jan. 9, 2002 (DE) ........................................ 102 00 436

(51) Int. Cl.[7] ........................ G05B 19/18; G06F 19/00; G06F 15/00; G01C 17/00; G01C 19/00
(52) U.S. Cl. ......................... 700/174; 700/56; 702/150
(58) Field of Search ........................ 700/56, 159, 174, 700/177, 186, 195; 702/150

(56) References Cited

U.S. PATENT DOCUMENTS

| | | | | |
|---|---|---|---|---|
| 3,564,218 A | * | 2/1971 | Lay | ............................ 377/17 |
| 4,573,139 A | * | 2/1986 | Bonivich | ...................... 700/56 |
| 4,779,211 A | * | 10/1988 | March | ......................... 702/150 |
| 5,239,479 A | * | 8/1993 | Nolting et al. | .............. 700/174 |
| 6,029,118 A | * | 2/2000 | Strasser | ....................... 702/94 |
| 6,810,351 B2 | * | 10/2004 | Katsurahira | ................. 702/150 |
| 6,829,557 B2 | * | 12/2004 | Hausschmid et al. | ........ 702/150 |
| 2004/0039545 A1 | * | 2/2004 | Katsurahira | ................. 702/150 |

FOREIGN PATENT DOCUMENTS

| | | |
|---|---|---|
| DE | 198 26 875 | 12/1999 |
| EP | 0 742 505 | 11/1996 |

* cited by examiner

Primary Examiner—Leo Picard
Assistant Examiner—R Jarrett
(74) Attorney, Agent, or Firm—Kenyon & Kenyon

(57) ABSTRACT

A position transducer is connected to merely one input circuit. The outputs of the input circuit are connected, transmitted or routed, in part, to a first and to a second counter circuit. For the counting process, the first counter circuit uses the digital signals of the input circuit, while the second counter circuit generates digital signals from the analog signals and uses them for the counting process. It is, thus, possible, in spite of a not fully two-channel processing of the signals of a position transducer, to set up a reliable position monitoring using only one position transducer.

20 Claims, 2 Drawing Sheets

DEVICE FOR RELIABLE POSITION MONITORING

CROSS-REFERENCE TO RELATED APPLICATIONS

The present application claims priority from application Ser. No. 102 00 436.6, filed in the Federal Republic of Germany on Jan. 9, 2002, which is expressly incorporated herein in its entirety by reference thereto.

FIELD OF THE INVENTION

The present invention relates to a device for reliable position monitoring. Such devices are used in machine-tool control applications, for example, where reliably monitoring of a position of a tool is of utmost importance.

BACKGROUND INFORMATION

Modern machine tools are operated by numerical controls, which, with the processing of a selected parts program, automatically execute previously defined actions. In this context, to control the drives of the various axes of a machine tool, it is especially significant to correctly determine the position of each drive or of the machine part driven by the drive. Since safety-related functions are often associated with these positions (thus, for instance, tools must not leave a previously defined motion space), it is necessary to reliably design the position detection. In this context, a two-channel position detection or position monitoring is often required for especially critical applications. The signals are processed separately from one another by two separate position transducers, and the resulting positions are compared to one another. In the case of a deviation of the positions, an error in one of the two position-detecting channels can be assumed. A safe state must then be immediately established, for instance, by a forced emergency stop. A two-channel position monitoring of this kind is described, for instance, in European Published Patent Application No. 0 742 505. The outputs of two transducer systems are evaluated in each instance in independent circuits, and the results compared to one another. In many applications, two transducer systems are provided when, for instance, a separate position transducer is used for the speed control and for the positional control of a drive. If, from the side of the control, however, only one position transducer is necessary, then a second position transducer for the two-channel position monitoring signifies additional outlay.

It has previously been proposed, therefore, to operate systems having only one position transducer and, in this context, to design the signal evaluation such that a reliable position monitoring is still possible. German Published Patent Application No. 198 26 875 describes a position transducer DG, the output signals of which are directed to two independent processors CPU1, CPU2. The cabling expenditure this requires (Y—distribution of the signals of the position transducer) is often considerable, however, particularly when (as is customary in machine tools) the drives and the control electronics are situated at a considerable distance from one another.

It is therefore an object of the present invention to provide a device for reliable position monitoring which uses one position transducer and requires little outlay for connecting the position transducer.

SUMMARY

The above and other beneficial objects of the present invention are achieved by providing a device as described herein.

According to one example embodiment of the present invention, it is provided to transmit the output signals of one position transducer to only one input circuit, the output signals, in turn, of which are fed to two counter circuits. Since now, the process-of evaluating the signals from the position transducer is also no longer performed on a completely two-channel basis, measures may be taken to prevent even one single error from leading to incorrect positional values. This is achieved in that a function of the input circuit (the formation of digital square-wave signals from analog sinusoidal signals) is only used for driving the first counter circuit. However, for the second counter circuit, this functionality exists separately. For that reason, analog and digital signals are fed to the first counter circuit, but only analog signals to the second counter circuit. The digital signals needed for counting in the second counter circuit are generated there from the analog signals.

Since the position transducer merely needs to be connected to an input circuit, the outlay for connecting the position transducer is reduced in comparison to conventional systems. It may, nevertheless, be ensured through appropriate measures that one single error may not lead to incorrect positional measurements, i.e., that such an error may be reliably detected.

Further aspects of the present invention and details pertaining thereto are described below with reference to an example embodiment and with reference to the Figures.

DETAILED DESCRIPTION

Figure 1:
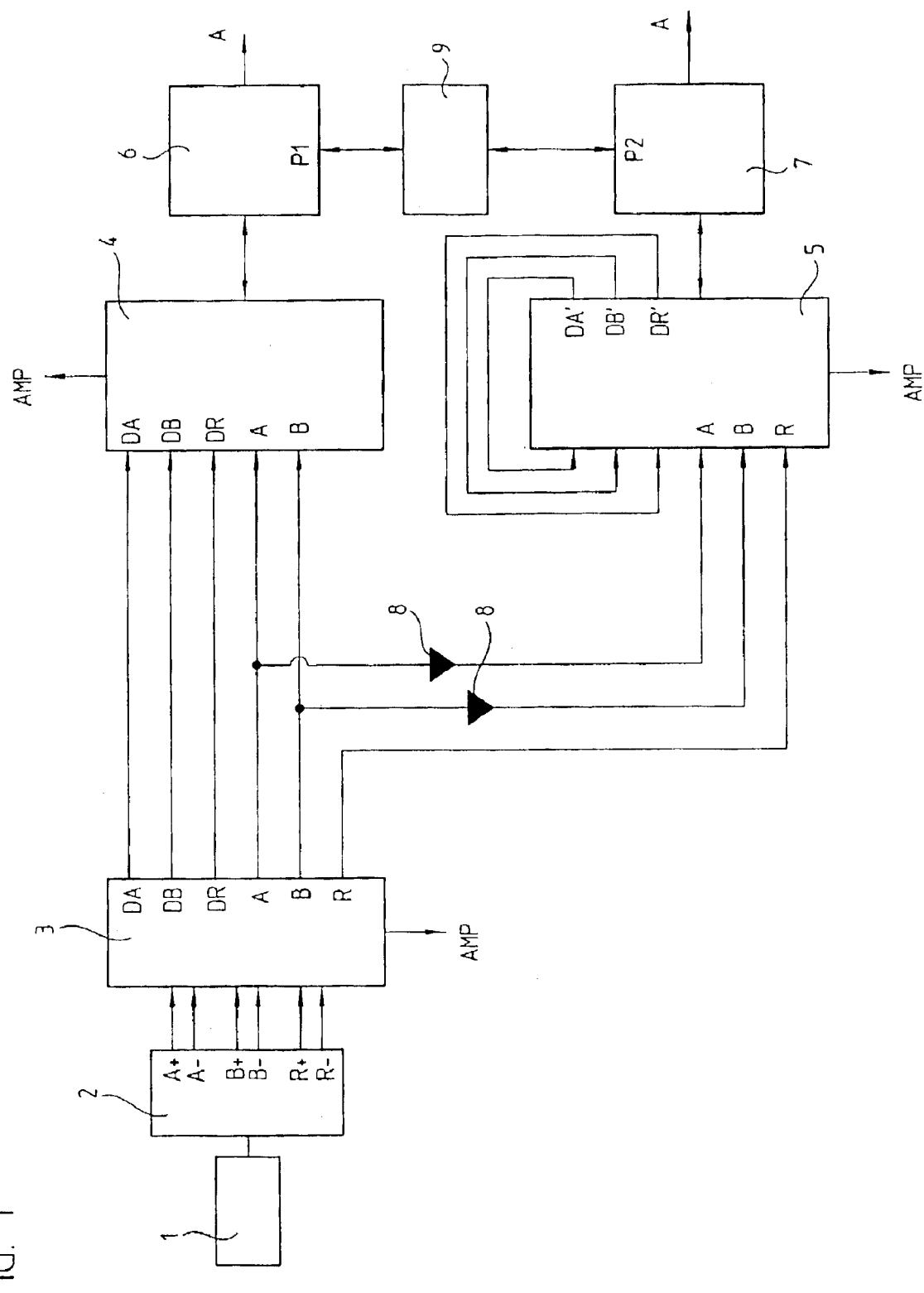
FIG. 1 is schematic view of a device for reliable position monitoring according to the present invention.

FIG. 1 illustrates a drive 1, which, via a spindle, for example, enables a linear positioning of a tool. To drive drive 1 and to be able to control the positioning in accordance with a parts program, a position transducer 2 is provided which is connected to the shaft of the drive. In this exemplary embodiment, output signals A+ and A− of position transducer 2 are sinusoidal signals each having inverted signs. Output signals B+ and B− of position transducer 2 are sinusoidal signals, each with inverted signs, the signal period of which corresponds to that of signals A+ and A−, but which are phase-shifted by one fourth of the signal period with respect to signals A+ and A−, respectively. R+ and R− form a reference signal of position transducer 2 which, in this exemplary embodiment, only occurs once per rotation of the axis or spindle of position transducer 2. There are also position transducers 2 having a plurality of reference signals per rotation. R+ and R− are composed, for instance, of an individual triangular pulse, each having inverted signs.

Figure 2:
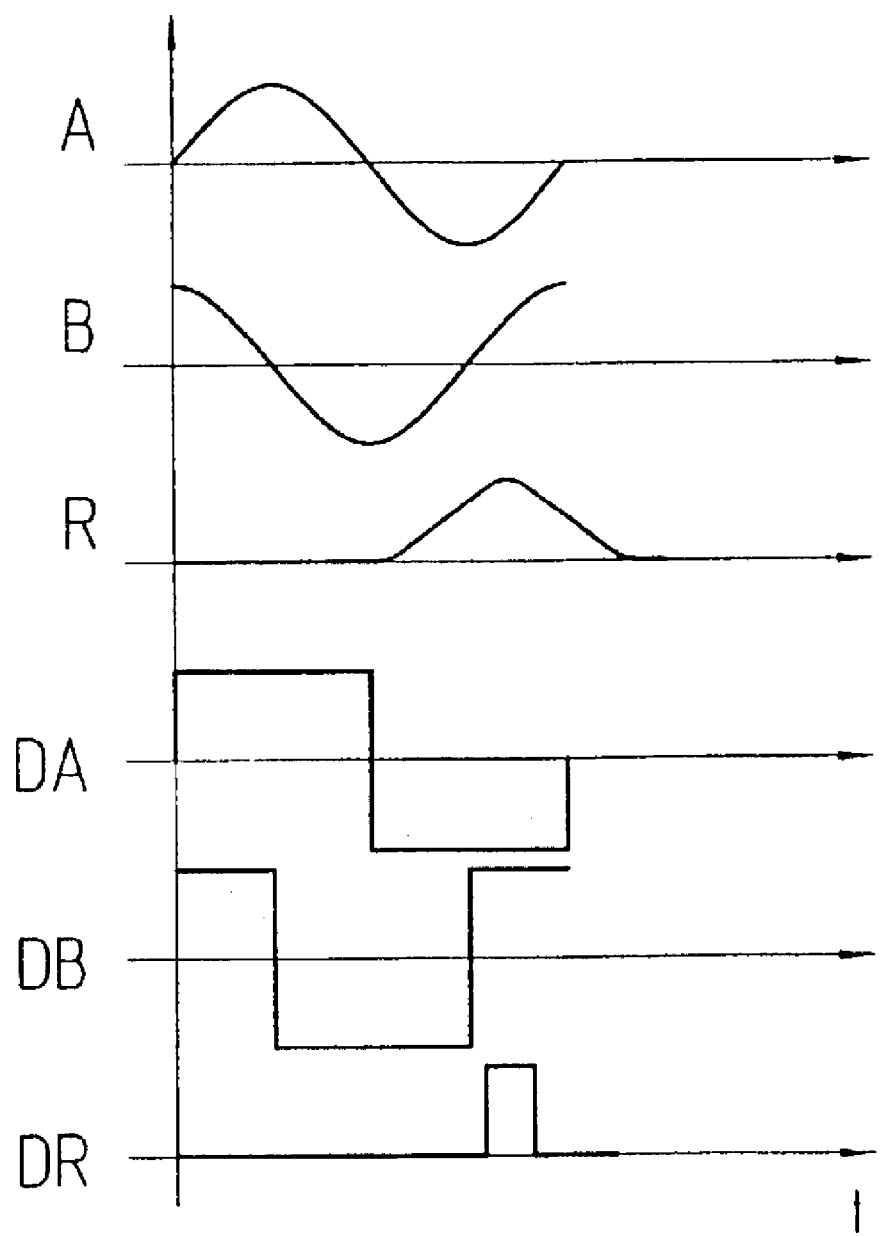
FIG. 2 is a graph of various signal shapes.

These six output signals A+, A−, B+, B−, R+, R− of position transducer 2 are connected or fed to an input circuit 3. There, differential amplifiers initially form analog signals A, B, R, which are independent of the potential of the outputs of the position transducer. These signals are illustrated in FIG. 2. One discerns that A and B continue to be sinusoidal and shifted by one fourth of their signal period relative to each other. Reference pulse R is, in addition, a triangular signal which occurs only once per rotation of position transducer 2. In addition to these signals A, B, R, digital signals DA, DB, DR are generated in comparators and made available at the output of input circuit 3. As illustrated in FIG. 2, DA and DB are again shifted with respect to one another by one fourth of their period length. Reference pulse DR is an individual triangular pulse which occurs only once per rotation of position transducer 2.

Input circuit 3 includes, moreover, a capability to monitor the amplitudes of signals A+, A−, B+, B− of position transducer 2. If the amplitude of one of these signals A+, A−, B+, B− is outside of a predefinable range, then, via an output AMP of input circuit 3, an alarm may be output, making possible an appropriate reaction. This enables errors to be detected, such as interruption, break or ground fault of a connecting line between the position transducer and input circuit. A breakdown in the position transducer itself may be detected when, for instance, the light source of an optical measuring system fails.

Signals DA, DB, DR, A and B are connected, transmitted or routed to a first counter circuit 4. This counter circuit 4 contains a counter which, on the basis of digital signals DA and DB, counts up or down, depending on the phase position of the edges of DA and DB. This phase position is dependent upon the moving direction of position transducer 2. Thus, the counter content is a measure of the position of the drive, i.e., of the position of the object moved by the drive. This counter content, reading or status is transmitted to a first processor 6 which (together with information on reference pulses DR) is able to calculate a rough position therefrom. To render possible a more accurate positional calculation, first processor 6 may, moreover, query a value interpolated from analog signals A and B, from counter circuit 4, and, thus, determine a more accurate positional value P1.

First counter circuit 4 also includes a capability to monitor the amplitude of signals A, B, to ensure that a predefinable amplitude range may be observed. In the event of an error, an output AMP at first counter circuit 4 may output a message to that effect.

To ensure, at this point, an enhanced reliability on the basis of a diverse signal evaluation, signals A, B may be fed via decoupling amplifier 8 to the input of a second counter circuit 5. In this context, decoupling amplifiers 8 may ensure that errors in the second channel of the signal evaluation are not able to affect the first channel. Thus, a short-circuit between inputs A, B of second counter circuit 5 may not short-circuit input A, B of first counter circuit 4. In this case, different counter contents or readings may be obtained in counter circuits 4 and 5, which, as described further below, may lead to an appropriate alarm A.

Since second counter circuit 5 also requires digital (square-wave) signals for the counter, these signals DA' and DB' are generated in separate comparator circuits from analog signals A, B. This comparator circuit may not be implemented in the same manner as the comparator circuit of input circuit 3. In the case of an implementation of the present invention using an integrated circuit (e.g., ASIC), various circuit layouts may thus be used. In a software implementation, a different program code may be used. The same may also apply to reference pulse DR', which is formed from analog signal R of the input circuit and, together with the counter content of second counter circuit 5, is used in a second processor 7 to determine position.

Second counter circuit 5 includes a capability to monitor the amplitude of signals A, B, to ensure that a predefinable amplitude range may be observed. In the event of an error, an output AMP at second counter circuit 5 may output a message to that effect.

Should identical circuits (e.g., ASICs) be used for counter circuits 4 and 5, then the comparators of counter circuit 5 necessary for forming digital signals DA', DB' and DR' remain unused in counter circuit 4.

The counter content of counter circuit 5, determined on the basis of digital signals DA', DB', is transmitted to a second processor 7, which (together with information on reference pulses DR') may calculate a rough position therefrom. To facilitate a more accurate positional calculation, second processor 7 may, moreover, query a value interpolated from analog signals A and B, from counter circuit 5, and, thus, determine a more accurate positional value P2. Counter circuits 4, 5 may also be configured to enable processors 6, 7 to query precise positional values.

Processors 6 and 7 thus form or receive positional values P1 and P2, which are derived from different, in part diversely configured signal paths.

Via a shared memory area 9, processors 6 and 7 exchange positional values P1 and P2. Each processor 6, 7 compares, on its own, the two values and outputs an alarm signal A when positional values P1, P2 do not conform, agree or match (e.g., because of rounding-off errors in the calculations, deviations within certain limits still being allowed, i.e., still being recognized as conforming). A master control may react to alarm signal A, for example, with or by triggering an emergency stop. Alternatively, a comparator (configured as a more secure comparator) may check positional values P1, P2 of processors 6, 7 to verify conformity and, in the event of nonconformity, output an alarm A.

It may, thus, be ensured that the occurrence of a single error is detected, either via an amplitude monitoring (in input circuit 3 or in one of counter circuits 4, 5) or via the comparison of positional values P1, P2, and that it is reacted to appropriately.

A very flexible numerical control may be obtained, which is suitable for various requirements, when the numerical control includes a circuit for secure position monitoring, which, in addition to the circuit described above, includes a second input circuit (corresponding to first input circuit 3). Using a change-over switch, the switch may then be made between a secure one-transducer operation, as described, and a two-transducer operation. This change-over switch may merely need to interrupt the connections between the outputs of input circuit 3 and second counter circuit 5, and connect the outputs of the second input circuit (which is connected on the input side to a second position transducer) to second counter circuit 5. In this context, only the analog signals may be used by this second input circuit, whereas digital signals DA', DB', DR' continue to be generated in second counter circuit 5. Thus, channels, which are at least, in part, diversely set up, also exist in the two-transducer operation. It is also possible, however, to use the digital signals generated in the second input circuit, so that two fully symmetrical channels are available for position monitoring.

The present invention may be suited for all types of rotary and linear position transducers, which supply at least two sinusoidal signals that are shifted by one fourth of their signal period. It may also not be necessary that the position transducers be directly connected to the shaft of a drive. Instead, they may also be mounted such that they engage directly on the object to be positioned.

What is claimed is:

1. A device for secure position monitoring, comprising:
  a first counter circuit;
  a second counter circuit;
  an input circuit including a first subset of output signals A, B, DA, DB, DR connected in part to the first counter circuit and including a second subset of output signals A, B, R connected in part to the second counter circuit; and a position transducer including output signals A+, A−, B+, B−, R+, R− connected to the input circuit;

wherein the second counter circuit is configured to form signals DA', DB', DR' necessary for counting from the second subset of output signals of the input circuit.

2. The device according to claim 1, further comprising:

a first processor configured to form a first positional value on a basis of a counter content of the first counter circuit; and a second processor configured to form a second positional value on a basis of a counter content of the second counter circuit.

3. The device according to claim 2, wherein each of the first processor and the second processor is arranged to feed a positional value to the other of the first processor and the second processor, each processor configured to output an alarm signal in a case that the positional values do not conform.

4. The device according to claim 1, wherein the input circuit includes a circuit configured to monitor amplitudes of the output signals A+, A−, B+, B− of the position transducer and configured to generate an alarm signal in response to a deviation of the amplitudes from a predefined range.

5. The device according to claim 1, wherein the first and second counter circuits include circuits configured to monitor amplitudes of the output signals A, B of the input circuit and configured to generate an alarm signal in response to a deviation of the amplitudes from a predefined range.

6. The device according to claim 1, wherein the output signals A, B of the input circuit are connected via decoupling amplifiers to the second counter circuit.

7. The device according to claim 1, wherein the output signals A, B are sinusoidal.

8. The device according to claim 1, wherein the output signals DA, DB, DA', DB' are square-wave signals.

9. The device according to claim 1, wherein signal pairs A, B, DA, DB and DA', DB' are shifted by one fourth of a signal period relatively to each other.

10. The device according to claim 1, further comprising a second input circuit configured to switch over between a secure one-transducer operation and a secure two-transducer operation.

11. A numerical control for controlling a machine tool, comprising:

a secure position monitor device including:
 a first counter circuit;
 a second counter circuit;
 an input circuit including a first subset of output signals A, B, DA, DB, DR connected in part to the first counter circuit and including a second subset of output signals A, B, R connected in part to the second counter circuit; and
 a position transducer including output signals A+, A−, B+, B−, R+, R− connected to the input circuit;
 wherein the second counter circuit is configured to form signals DA', DB', DR' necessary for counting from the second subset of output signals of the input circuit.

12. The numerical control according to claim 11, wherein the secure position monitor device includes:

a first processor configured to form a first positional value on a basis of a counter content of the first counter circuit; and a second processor configured to form a second positional value on a basis of a counter content of the second counter circuit.

13. The numerical control according to claim 12, wherein each of the first processor and the second processor is arranged to feed a positional value to the other of the first processor and the second processor, each processor configured to output an alarm signal in a case that the positional values do not conform.

14. The numerical control according to claim 11, wherein the input circuit includes a circuit configured to monitor amplitudes of the output signals A+, A−, B+, B− of the position transducer and configured to generate an alarm signal in response to a deviation of the amplitudes from a predefined range.

15. The numerical control according to claim 11, wherein the first and second counter circuits include circuits configured to monitor amplitudes of the output signals A, B of the input circuit and configured to generate an alarm signal in response to a deviation of the amplitudes from a predefined range.

16. The numerical control according to claim 11, wherein the output signals A, B of the input circuit are connected via decoupling amplifiers to the second counter circuit.

17. The numerical control according to claim 11, wherein the output signals A, B are sinusoidal.

18. The numerical control according to claim 11, wherein the output signals DA, DB, DA', DB' are square-wave signals.

19. The numerical control according to claim 11, wherein signal pairs A, B, DA, DB and DA', DB' are shifted by one fourth of a signal period relatively to each other.

20. The numerical control according to claim 11, wherein the secure position monitor device includes a second input circuit configured to switch over between a secure one-transducer operation and a secure two-transducer operation.

* * * * *